United States Patent [19]
Maniwa et al.

[11] Patent Number: 5,704,978
[45] Date of Patent: Jan. 6, 1998

[54] COATING APPARATUS

[75] Inventors: Osamu Maniwa; Shogo Sato, both of Miyagi, Japan

[73] Assignee: Sony Corporation, Tokyo, Japan

[21] Appl. No.: 651,720

[22] Filed: May 22, 1996

[30] Foreign Application Priority Data

| May 23, 1995 | [JP] | Japan | 7-123434 |
| Nov. 21, 1995 | [JP] | Japan | 7-303069 |
| Nov. 21, 1995 | [JP] | Japan | 7-303073 |

[51] Int. Cl.$^6$ ............................................. B05C 3/02
[52] U.S. Cl. ........................ 118/410; 427/549; 118/419
[58] Field of Search ................................ 427/549, 547; 118/410, 411, 419

[56] References Cited

U.S. PATENT DOCUMENTS 3,681,138  8/1972  Ankenbrand et al. .

FOREIGN PATENT DOCUMENTS 1059104  2/1967  United Kingdom .

Primary Examiner—Brenda A. Lamb
Attorney, Agent, or Firm—Hill, Steadman & Simpson

[57] ABSTRACT

There is provided a coating apparatus capable of achieving high-speed coating and a decrease in thickness of a coating film and obtaining a preferable coating film. In an extrusion type coating apparatus including a die having a coating material reservoir to which a coating material is supplied, the coating material being coated on a continuously traveling support member while the coating material is extruded from a slit formed in a tip of the die, a magnet portion having adjacent tip portions to form a magnetic gap is arranged such that the magnetic portion and the tip portion of the die face each other to interpose the support member therebetween, and upper and lower lips defining the slit at the tip of the die are arranged out of contact with the support member.

13 Claims, 6 Drawing Sheets

COATING APPARATUS

BACKGROUND OF THE INVENTION

1. Field of the Invention

The present invention relates to a so-called extrusion type coating apparatus and, more particularly, to a coating apparatus which is preferably used to coat a magnetic coating material when a magnetic recording medium is manufactured.

2. Prior Art

As an audio tape or a video tape, a so-called coating type magnetic recording medium in which a magnetic layer is formed such that a magnetic coating material obtained by dispersing and kneading a magnetic powder, a binder, a disperant, a lubricant, and the like in an organic solvent is coated on a non-magnetic support member such as a polyester film is generally used.

When the coating type magnetic recording medium is to be manufactured, a conventional coating apparatus using a roll such as a gravure roll or a reverse roll is used as an apparatus for coating a magnetic coating material on a support member. An apparatus employing a direct gravure scheme which can widely coat a coating material having structural viscosity (thixotropy) is generally used.

In consideration of abrasion resistance, a surface process such as a hard chromium process is applied to the gravure scheme. Depending on the structural viscosity, transfer properties of the coating material from the roll to the base film serving as the support member is degraded, so that variations in output caused by a nonuniform coating thickness or dropout caused by coating splash easily occur. As a coating speed increases, these problems intend to be conspicuous.

In particular, as in a case wherein the magnetic layer of a floppy disk is formed, when a magnetic coating material having high structural viscosity or a metal-based magnetic coating material is transferred onto a support member having a thickness of 50 μm or more, an air layer is easily formed between the cell groove of the gravure roll and the support member. As a result, transferral failure easily occurs.

As a new coating apparatus capable of solving these problems, an extrusion (die) type coating apparatus has attracted attention. Some extrusion type coating apparatuses have been practically used.

The extrusion type coating apparatus involves a die having a wide slit formed in the tip surface and a doctor edge formed near the tip portion. The extrusion type coating apparatus has an arrangement in which a magnetic coating material continuously extruded to the surface of the traveling support member is coated on the support member by the doctor edge to have a uniform thickness. A coating liquid reservoir is formed on the rear surface side of the slit. The coating material supplied from both the sides of the die is supplied into the slit through the coating liquid reservoir.

Such an extrusion type coating apparatus can easily form a coating having a uniform thickness, and advantageously has low cost and small size because no roll having a large diameter is used in the extrusion type coating apparatus. In addition, since all the coating material supplied into the die is coated, the coating material need not be circulated around the die. For this reason, the extrusion type coating apparatus has been used in the fields of photographic films and photographic paper.

In recent years, in a coating type magnetic recording medium, a coating technique which sufficiently cope with high-speed coating or a decrease in thickness of a magnetic coating film has been demanded to improve productivity.

In the extrusion type coating apparatus, in order to form a thin magnetic coating film without a nonuniform thickness, for example, as disclosed in Japanese Unexamined Patent Publication No. 62-95170, the following method is proposed. That is, a slit formed in a die tip is pressed against a support member without supporting the rear surface of the traveling support member, a permanent magnet having a magnetic force of 50 to 5,000 gauss is arranged so that the support member is interposed between the slit and the permanent magnet, and a magnetic coating material is extruded from the slit to be coated. As disclosed in Japanese Unexamined Patent Publication No. 4-214229, there is provided a method in which an electro-magnet is used in place of the permanent magnet, the direction of a magnetic flux is ruled on the basis of the angle formed by the surface of the support member and the direction of the magnetic flux. Note that the tip of the die in each of the coating apparatuses consists of a non-magnetic material.

However, even if the above methods are applied, the movement of the magnetic coating material cannot be completely assured in high-speed coating, and stable coating cannot be performed, therefore a nonuniform thickness is obtained.

As described above, in the conventional coating apparatus, a sufficient effect related to high-speed coating and a decrease in thickness of a coating film cannot be actually obtained.

SUMMARY OF THE INVENTION

The present invention has been provided in consideration of the above conventional circumstances, and has its object to provide a coating apparatus capable of achieving high-speed coating and a decrease in thickness of a coating film and obtaining a preferable coating film.

A coating apparatus according to the present invention, which is provided to achieve the above object, is an extrusion type coating apparatus comprising a die having a coating material reservoir to which a coating material is supplied, the coating material being coated on a continuously traveling support member while the coating material is extruded from a slit formed in a tip of the die, wherein a magnet portion having adjacent tip portions to form a magnetic gap is arranged such that the magnetic portion and the tip portion of the die face each other to interpose the support member therebetween, and upper and lower lips defining the slit at the tip of the die are arranged out of contact with the support member.

In a general extrusion type coating apparatus, a die having a wide slit formed in the tip surface and a doctor edge formed near the tip surface is used, and a coating material continuously extruded to the surface of a traveling support member is coated on the support member by the doctor edge to have a uniform thickness. However, in this coating apparatus, the lower lip is not functioned as the doctor edge, and the support member is caused to travel out of contact with the lower lip. When the lip is out of contact with the support member, the lip does not damage or shave the surface of the support member, and it is difficult to form scratches on the formed coating film caused by dust, a foreign material, shavings of the support member, or the like.

As described above, in the coating apparatus, since the magnet portion is arranged so that the support member is interposed between the die and the magnet portion, when the coating material contains a magnetic material, the movement of the coating material extruded from the slit is assured by a magnetic flux from the magnet portion. In this case, the upper and lower lips can be composed of a non-magnetic material. However, when the lips are composed of the magnetic material, the direction of the magnetic flux can be preferably controlled.

Assume that the magnet portion has adjacent tip portions to form a magnetic gap. In this case, a magnetic flux can be concentrated from the magnetic gap to both the lips. Assume that the magnet portion has adjacent tip portions to form a magnetic gap. In this case, the magnet portion may be entirely composed of a permanent magnet, and a permanent magnet may be interposed between yokes composed of a material having high magnetic permeability. As the permanent magnet, a conventional known magnet represented by an Alnico magnet, a rare earth magnet, a ferrite magnet, or the like can be used. An electromagnet may be used in place of the permanent magnet.

In this case, the interval between the tip of the magnet portion and the tip of the die is preferably set to be 0.2 to 3 mm. If the interval is excessively small, the magnetic flux does not face both the lips. In contrast to this, if the interval is excessively large, the magnetic flux cannot be concentrated.

The arrangement position of the magnet portion with respect to the die is preferably set so that the upper end surface of the magnetic gap is located within the range of ±1 mm with reference to the height of the upper end surface of the slit in the die. When the arrangement position of the magnet portion is out of the range, the effect that the movement of the coating material is assured by the magnetic flux is degraded.

A magnetic force near the tip of the die, i.e., a magnetic force near both the lips, may be preferably selected on the basis of a coating speed and coating characteristics (viscosity, surface tension, or the like). If the magnetic force is excessively weak, the movement of the coating material cannot be assured; and if the magnetic force is excessively strong, surface roughness occurs on the obtained coating film. For this reason, the magnetic force near both the lips is preferably set to be a magnetic force of 500 to 6,000 gauss, particularly, 3,000 to 6,000 gauss.

The coating apparatus according to the present invention may be an extrusion type coating apparatus comprising a die having a coating material reservoir to which a coating material is supplied, the coating material being coated on a continuously traveling support member while the coating material is extruded from a slit formed in a tip of the die, wherein a magnet portion having adjacent tip portions to form a magnetic gap is arranged so that the magnetic portion and the tip portion of the die face each other to interpose the support member therebetween, and the upper and lower lips defining the slit at the tip of the die consist of a magnetic material and are arranged so that the lower lip is in contact with the support member.

More specifically, in the coating apparatus in which the lower lip is functioned as a doctor edge, and coating is performed so that the support member travels while the support member is in contact with the lower lip through the coating material, the magnet portion is arranged so that the die and the magnet portion face each other to interpose the support member therebetween, and the upper and lower lips consist of a magnetic material. In this case, as in the coating apparatus in which the lips are arranged out of contact with the support member, the movement of the coating material extruded from the slit can be preferably assured by the magnetic flux from the magnet portion.

The positional relationship between the die and the magnet portion, the magnitude of the magnetic force near the lips, and the like in this coating apparatus can be set to be equal to those of the coating apparatus in which the lips are arranged out of contact with the support member.

In each of the above coating apparatuses, in either a case wherein the lips are arranged out of contact with the support member or a case wherein the lips are arranged in contact with the support member, when the relative positions of the die and the magnet portion with respect to the traveling support member are assured, the traveling direction of the support member and the arrangement direction of the die and magnetic portion can be arbitrarily set. For this reason, in this specification, the "upper" and "lower" do not necessarily represent the upper and lower sides in the vertical direction, but represent the upstream and downstream sides of the traveling direction of the support member. For this reason, the "upper lip" and "lower lip" do not mean that the upper lip is on the upper side of the lower lip in the vertical direction.

The coating apparatus described above is preferably applied to coating of a magnetic coating material in a coating type magnetic recording medium. However, in this case, conventional known materials can be used as the magnetic powder, the resin binder, and the like to form the support member and the magnetic coating material, and these materials are not limited to specific materials.

For example, as the support member, a polymeric substrate consisting of plastics represented by polyesters such as polyethylene terephthalate, polyolefines such as polyethylene and polypropylene, cellulose derivatives such as cellulose triacetate, cellulose diacetate, and cellulose butylate, vinyl resins such as polyvinyl chloride and polyvinylidene chloride, polycarbonates, polyimides, and polyamide imides, a metal substrate consisting of an Al alloy or a titanium alloy, a ceramics substrate consisting of alumina glass or the like, or a glass substrate is applicable. The shape of the support member is not limited to a specific shape. A tape-like, sheet-like, drum-like support member is applicable. When a rigid substrate such as an Al-alloy substrate or a glass substrate is used, an oxide coating film, an Ni-P coating film, or the like may be formed on the substrate surface by an alumite process to harden the surface. However, in consideration of continuous traveling of the support member, a tape-like or sheet-like flexible support member is preferably used.

As a magnetic powder constituting the magnetic coating material, ferromagnetic metal materials such as Fe, Co, and Ni, various ferromagnetic alloy materials containing, as a main component, Fe-Co, Fe-Ni, Fe-Co-Ni, Co-Ni, Fe-Mn-Zn, Fe-Ni-Zn, Fe-Co-Ni-Cr, Fe-Co-Ni-P, Fe-Co-B, Fe-Co-Cr-B, Fe-Co-V, or ferromagnetic metal particles consisting of an alloy material such as Mn-Bi or Mn-Al are preferably used. In order to improve various characteristics, elements such as Al, Si, Ti, Cr, Mn, Cu, Zn, Mg, P, etc. may be added to the magnetic powder. In addition, the magnetic powder may be a conventional known oxide magnetic powder consisting of $\gamma$-Fe$_2$O$_3$, Co-containing $\gamma$-Fe$_2$O$_3$, Fe$_3$O$_4$, Co-containing $\gamma$-Fe$_3$O$_4$, Co-adhering $\gamma$-Fe$_3$O$_4$, CrO$_2$, or the like.

As a binder, a homopolymer such as vinyl chloride, vinyl acetate, vinyl alcohol, vinylidene chloride, acrylic acid ester, methacrylic acid ester, styrene, butadiene, or acrylonitrile, a copolymer obtained by combining two or more of these polymers, a polyurethane resin, a polyester resin, epoxy resin, or the like is exemplified. In particular, a vinyl copolymer, a polyester-polyurethane copolymer, a polycarbonate-polyurethane copolymer, or nitrocellulose is preferably used.

As a solvent for dispersing the binder and the magnetic powder, a ketone-based solvent such as acetone, methyl ethyl ketone, methyl iso-butyl ketone, cyclohexanone, an ester-based solvent such as methyl acetate, ethyl acetate, buthyl acetate, ethyl lactate, or glycol acetate monoethyl ether, a glycol-ether-based solvent such as glycol dimethyl ether, glycol monoethyl ether, or dioxane, an aromatic hydrocarbon such as benzene, toluene, or xylene, an aliphatic hydrocarbon such as hexane or heptane, or a chlorinated hydrocarbon such as methylene chloride, ethylene chloride, carbon tetrachloride, chloroform, ethylene chlorohydrine, or dichlorobenezene is applicable.

A disperant, a lubricant, an abrasive, an antistatic agent, an anti-corrosion agent, and the like may be added to the magnetic coating material.

In addition to the magnetic layer, if necessary, a back coating layer, a top coating layer, or the like may be formed. In this case, conditions for formation of the back coating layer, the top coating layer, and the like may be conditions applied to a general method of manufacturing a magnetic recording medium of this type, and are not limited to specific conditions.

The coating apparatus according to the present invention can be also used not only when a magnetic coating material is coated but also when a back coating layer or a top coating layer is formed in the steps in manufacturing such a coating type magnetic recording medium.

The coating apparatus of the present invention can also be applied to the field for manufacturing a photographic film, photographic paper, or the like.

DESCRIPTION OF THE PREFERRED EMBODIMENTS

Embodiments to which the present invention is applied will be described below with reference to the accompanying drawings.

First Embodiment

Figure 1:
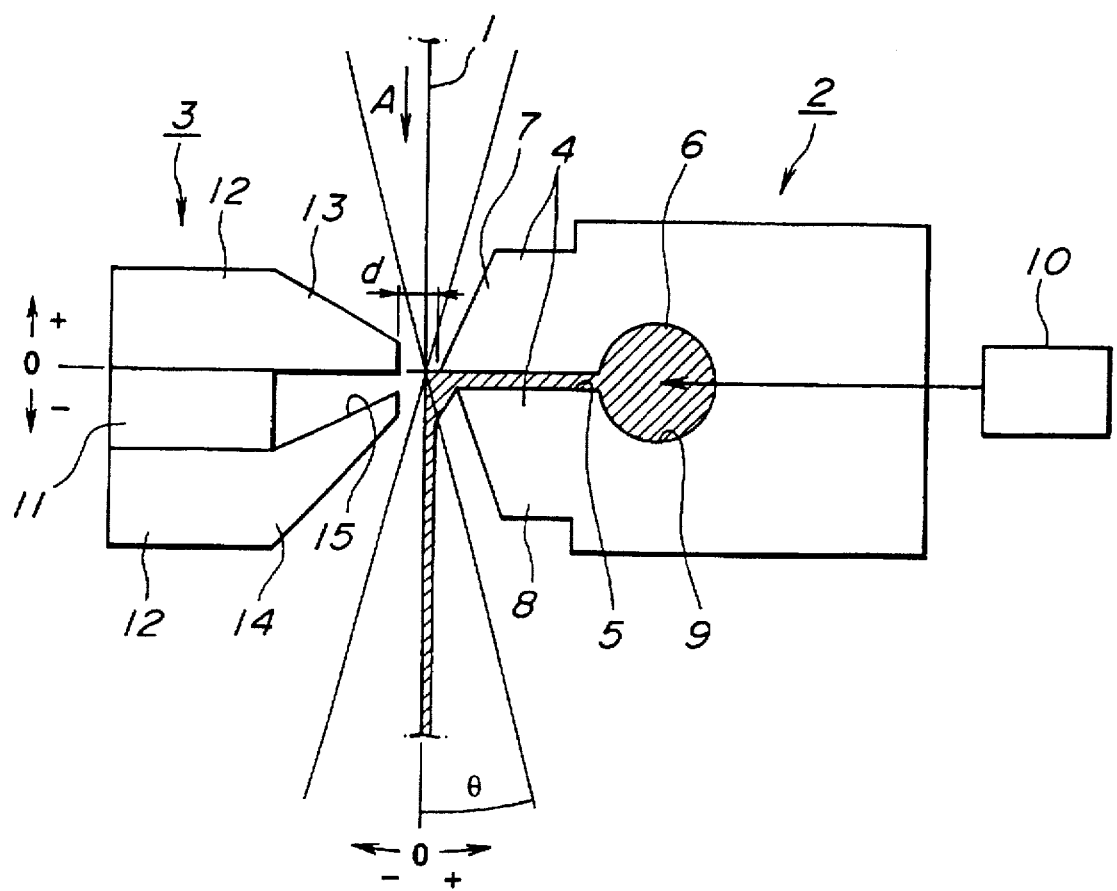
FIG. 1 is a sectional view schematically showing an arrangement of a coating apparatus according to the present invention.
Figure 2:
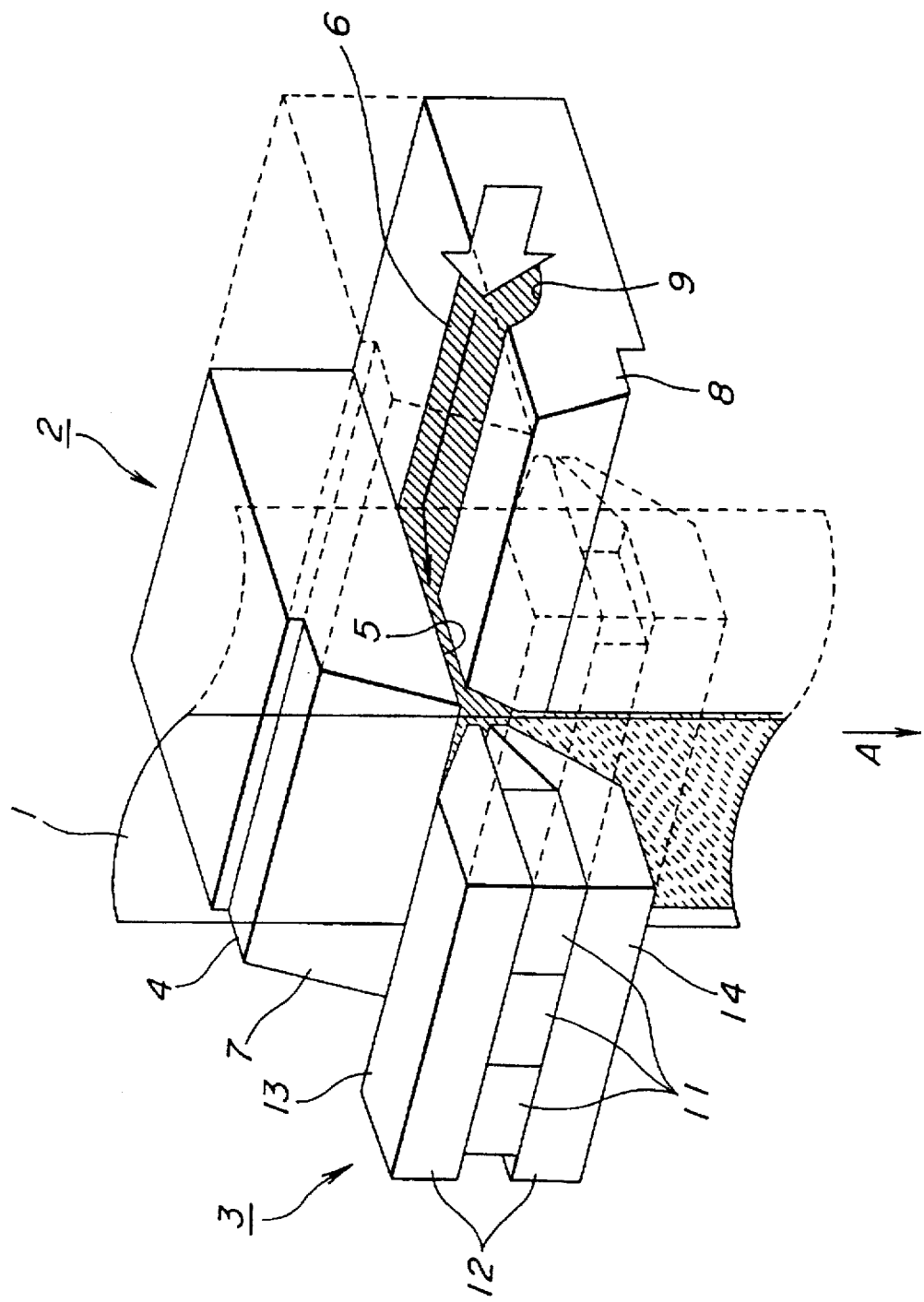
FIG. 2 is a perspective view showing a main part of the arrangement of the coating apparatus according to the present invention.

In a coating apparatus according to an embodiment of the present invention, as shown in FIGS. 1 and 2, a lip 4 defining a slit 5 at the tip of a die 2 is arranged out of contact with a support member 1. More specifically, in this coating apparatus, the die (extruder) 2 composed of an almost rectangular parallelopiped metal block which is arranged in the middle of a path on which the non-magnetic support member 1 having flexibility sequentially travels from a feeding side to a winding side in a direction A in FIG. 1, and a magnet portion 3 having a predetermined width is arranged so that the die 2 and the magnet portion 3 face each other to interpose the support member 1 therebetween.

The die 2 is arranged on the side of the support member 1 traveling in the direction A in FIG. 1, and the lip 4 formed at the tip portion of the die 2 is arranged with a predetermined interval between the lip 4 and the surface of the support member 1.

This lip 4 is composed of of a non-magnetic material or a magnetic material, and the slit 5 is formed in the tip surface of the lip 4 to have a width corresponding to a coating width. This slit 5 serves as a gap from which a coating material 6 composed of a magnetic material is extruded, and is a gap having a very small width of about 0.01 to 2.0 mm.

In this coating apparatus, the tip portion of a lower or second lip 8 is behind the tip portion of an upper or first lip 7. Since both the lips 7 and 8 are arranged out of contact with the support member 1, a portion near the tip of the upper lip 7 is not functioned as a front blade, or a portion near the tip of the lower lip 8 is not functioned as a smoothing blade.

A pocket (coating liquid reservoir) 9 connected to the slit 5 is formed on the rear surface side of the slit 5. This pocket 9 is formed as an orifice-like space having a length almost equal to the width of the slit 5.

Coating liquid supply ports (not shown) are formed in both the end portions of the pocket 9 so that openings are formed in both the surfaces of the die 2, and a coating liquid supply pipe for supplying the coating material 6 is connected to the coating liquid supply ports. A pump 10 is attached to the middle portion of the coating liquid supply pipe, and the coating material 6 is sent from the coating liquid supply pipe into the pocket 9 by a predetermined pressure from the pump 10. Therefore, the pocket 9 serves as a space for receiving the coating material 6 sent by the pressure, and has the function of an accumulator. The coating material 6 sent into the pocket 9 by the pressure is supplied into the slit 5, and then extruded from the tip portion of the slit 5 onto the surface of the traveling support member 1.

The support member 1 on which the coating material 8 is coated by the die 2 described above is supported by guide rolls (not shown), and these guide rolls applies proper tension to the support member 1, thereby performing smooth traveling. The guide rolls are rotatably arranged, can adjust the interval between the support member 1 and the tip of the lip 4, and can adjust an angle of the support member 1 with respect to the die 2.

In the magnet portion 3 arranged so that the magnet portion 3 and the die 2 interpose the support member 1 to have a gap having a predetermined width between the magnet portion 3 and the die 2, the upper and lower portions of a permanent magnet 11 respectively correspond to N and S poles, and the permanent magnet 11 is interposed between the upper and lower portions of the yoke 12. The upper portion (upper yoke or first arm 13) and the lower portion (lower yoke or second arm 14) of the yoke 12 have one ends which project from the permanent magnet 11, and the thickness of each yoke decreases toward its tip. In addition, the lower yoke 14 has a tip which is bent so as to be adjacent to the tip of the upper yoke 13.

For this reason, in the magnet portion 3, a magnetic gap 15 is formed between the tip of the upper yoke 13 and the tip of the lower yoke 14. Therefore, a magnetic flux can be generated toward the coating material 6 composed of a magnetic material, and a magnetic flux can be generated toward the lip 4 when the lip 4 is composed of a magnetic material.

Although not shown, the magnet portion 3 described above is fixed to a support table which can move the magnet portion 3 in an arbitrary direction, so that an interval d between the tip of the yoke 12 and the tip of the lip 4 and a height position h of the magnetic gap 15 with respect to the slit 5 can be adjusted. In this case, a height at which the height of the lower surface (corresponding to the upper end surface of the magnetic gap 15) of the upper yoke 13 in the magnet portion 3 and the height of the lower surface (corresponding to the upper end surface of the slit 5) of the upper lip 7 in the die 2 is set to be 0, and a direction in which the height of the magnet portion 3 with respect to the die 2 increases is represented by "plus", and a direction in which the the height of the magnet portion 3 with respect to the die 2 decreases is represented by "minus". In this manner, the height position h of the magnetic gap 15 is set.

With the arrangement described above, in this coating apparatus, when the coating material 8 extruded from the slit 5 formed in the tip surface of the lip 4 in the die 2 is to be adhered to the surface of the support member 1 traveling in the direction A in FIG. 1, the movement of the coating material 6 is assured by a magnetic flux from the magnetic gap 15 in the magnet portion 3, thereby performing preferable coating.

In the coating apparatus, the tip of the lip 4 is not in contact with the support member 1, the surface of the support member 1 can be prevented from being damaged or shaved, and it is difficult to form scratches on the formed coating film caused by dust, a foreign material, shavings of the support member, or the like.

Although FIGS. 1 and 2 show the arrangement in which the die and the magnet portion are arranged to coat a coating material on the support member 1 traveling from the upper side to the lower side in the vertical direction, the coating apparatus according to this embodiment is not limited to this arrangement. More specifically, let a line on which a surface (to be referred to as a slit central surface) extending from the center of the slit 5 and a major surface of the support member 1 cross each other be a center, and let an angle at which the slit central surface of the major surface of the support member 1 are perpendicular to each other be 0°. In this case, the traveling direction of the support member 1 with respect to the arrangement position of the die 2 and the magnet portion 3 may be rotated within the range of ±15°.

Figure 3:
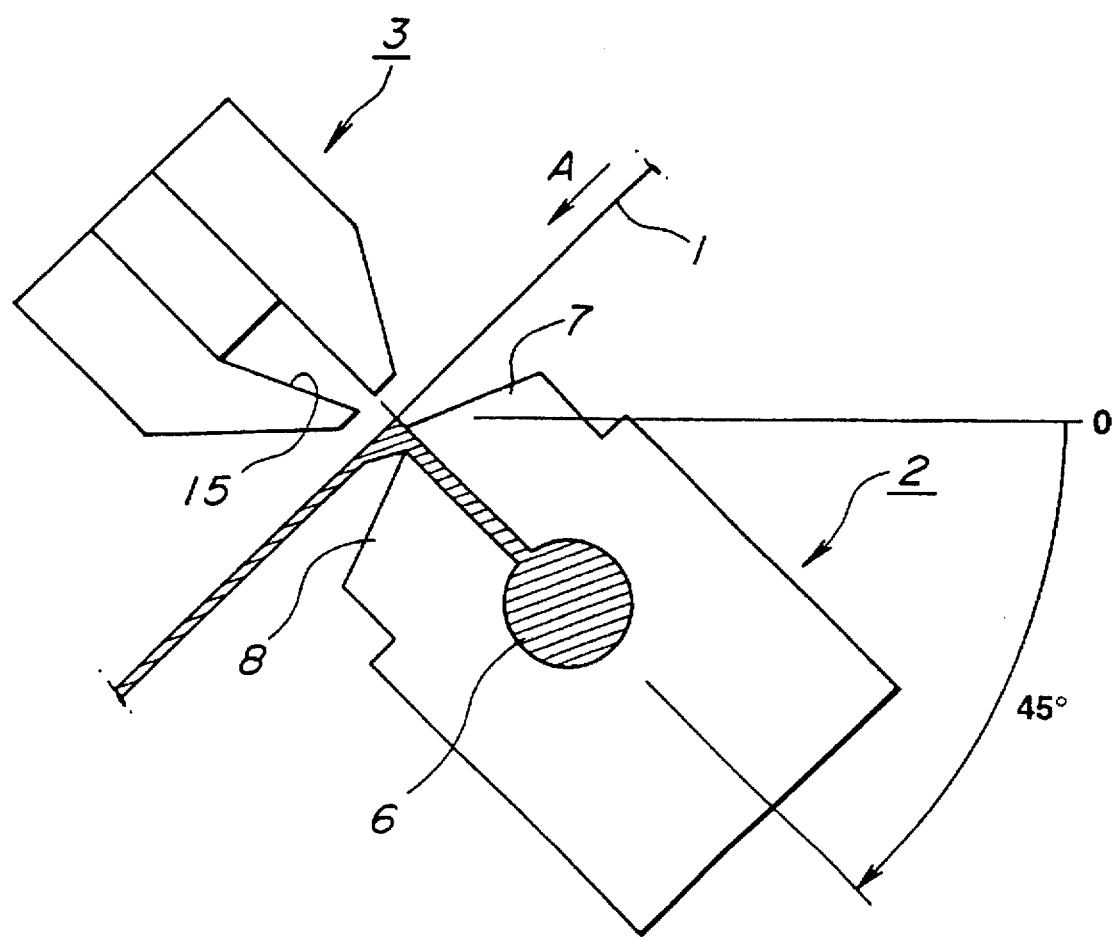
FIG. 3 is a sectional view schematically showing the coating apparatus in FIG. 1 arranged such that the traveling direction of a support member and the arrangement directions of a die and a magnet portion are tilted at 45°.
Figure 4:
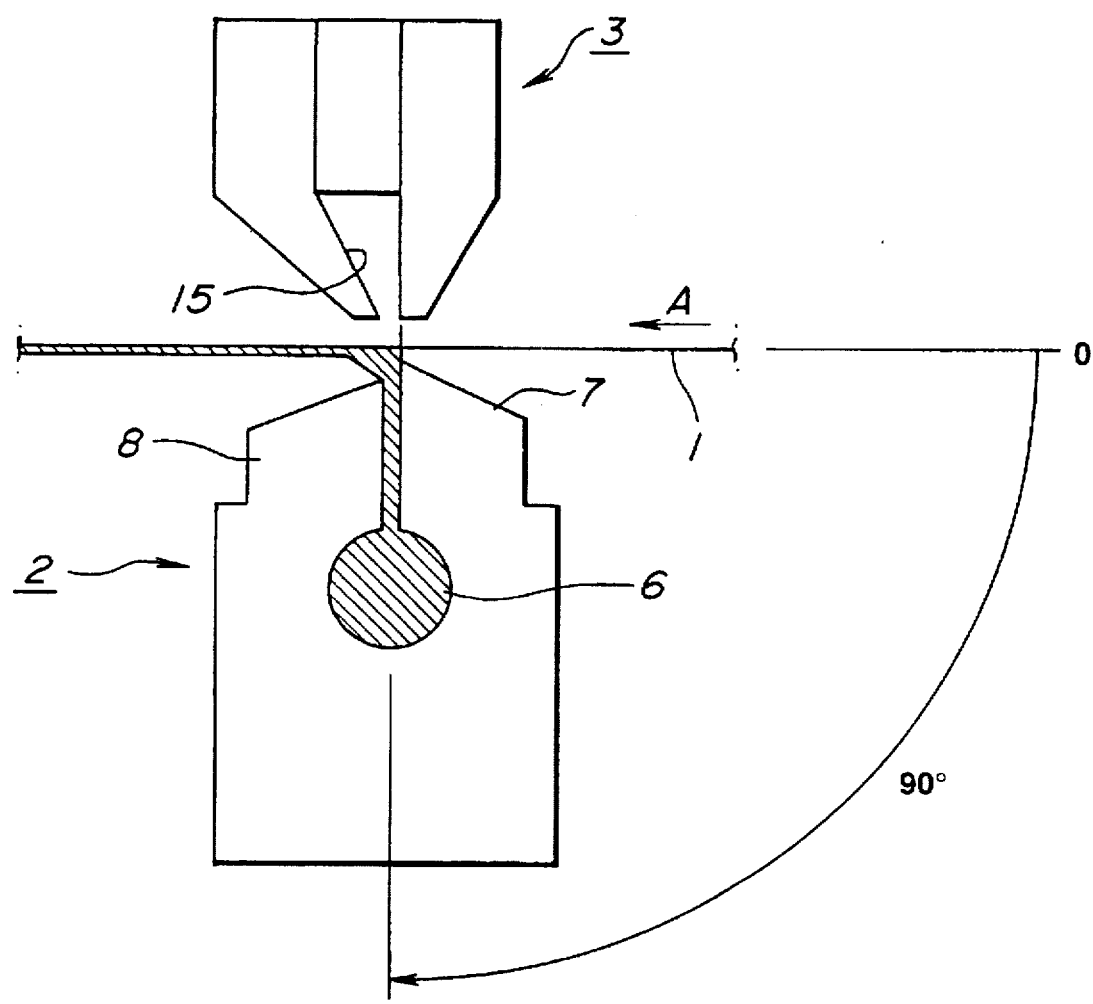
FIG. 4 is a sectional view schematically showing the coating apparatus in FIG. 1 arranged such that the traveling direction of the support member and the arrangement directions of the die and the magnet portion are tilted at 90°.

When the relative arrangements between the traveling support member 1 and the die 2 or the magnet portion 3 is within the above range, the traveling direction of the support member 1 and the arrangement directions of the die 2 and the magnet portion 3 can be arbitrarily set. More specifically, as shown in FIG. 3, the slit central surface of the die 2 may be tilted at 45° with reference to the horizontal plane, and, as shown in FIG. 4, the slit central surface may be rotated at 90° with reference to the horizontal plane, and may be rotated at an arbitrary angle.

Second Embodiment

Figure 5:
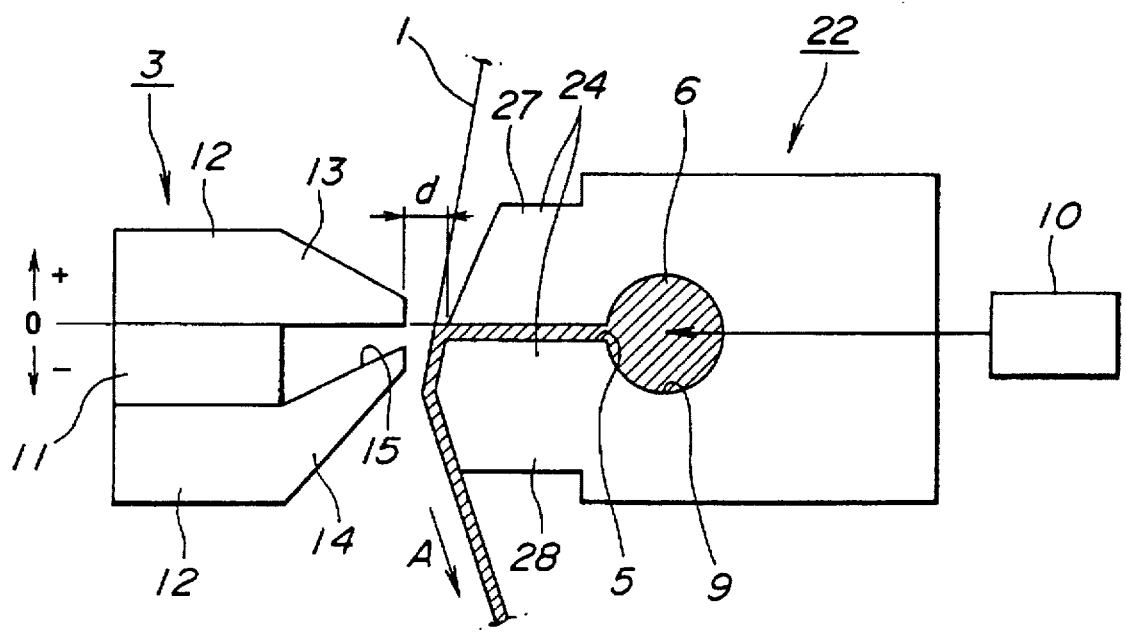
FIG. 5 is a sectional view schematically showing another arrangement of a coating apparatus according to the present invention.
Figure 6:
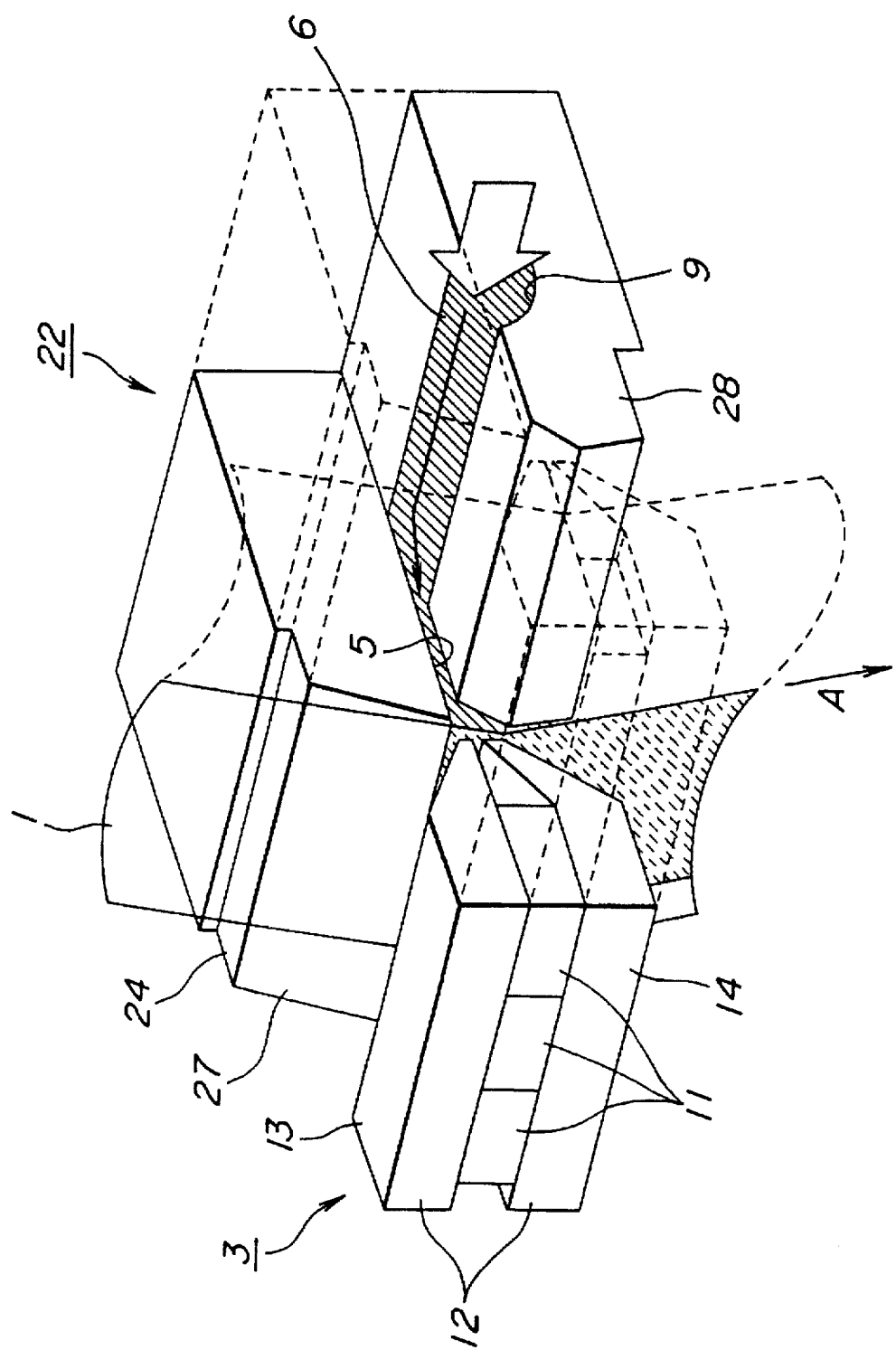
FIG. 6 is a perspective view showing a main part of the arrangement of the coating apparatus in FIG. 5.

In a coating apparatus according to this embodiment, as shown in FIGS. 5 and 6, the arrangement of a die 22 is different from that in the first embodiment. In the second embodiment, a lip 24 which defines a slit 5 at the tip of the lip 24 is arranged in contact with a support member 1.

In this coating apparatus, an upper lip 27 and a lower lip 28 defining the slit 5 are composed of a magnetic material. A portion near the tip surface of the upper lip 27 is straightly obliquely tapered to form a so-called wedge-shape, and functions as a front blade to regulate regulates a coating amount of a coating material 6 extruded onto the support member 1 through the slit 5. On the other hand, the lower lip 28 is formed so as to have its tip surface projected in contact with the support member 1, and functions as a smoothing blade to smooth the surface of the coating material 6 supplied onto the support member 1.

A guide roll applies proper tension to the support member 1 on which the coating material 6 is coated by the die 22 having the above arrangement, and the guide roll is movably arranged. For this reason, a holding amount of the support member 1 on the lip 24 side (holding amount of the support member 1 in the lip 24) is adjusted.

The rest of the arrangement of the coating apparatus is the same as that of the coating apparatus described in the first embodiment. Therefore, the same reference numerals as in FIGS. 1 and 2 denote the same parts in FIGS. 5 and 6, and a description thereof will be omitted.

In the coating apparatus having the above arrangement, the lip 24 in the die 22 is brought into contact with the surface of the support member 1 traveling in a direction A in FIGS. 5 and 6. The coating material 6 is extruded by the contact surface from the slit 5 formed near the tip surface of the lip 24, and a coating film is formed while the movement of the coating material 6 extruded from the slit 5 is assured by a magnetic flux extending from a magnetic gap 15 in a magnet portion 3 to both the lips 27 and 28.

EXAMPLES

In order to examine the coating performance of the coating apparatus described in the first and second embodiments described above, a magnetic coating material was actually coated on the non-magnetic support member 1.

Example 1

In this case, to examine the coating performance of the coating apparatus described in the first embodiment, various settings in the coating apparatus were performed to coat a magnetic coating material.

More specifically, by using the coating apparatus shown in FIGS. 1 and 2, a magnetic coating material was coated on the traveling support member 1 under the following conditions.

Settings in the Coating Apparatus

<Die>
overall width: 130 mm
coating width: 110 mm
lip 4: refractory metal (magnetic material)
   upper lip 7 thickness: 5 mm,
   lower lip 8 thickness: 3 mm,
   lower lip 8 being behind upper lip 7 by 1 mm
gap of slit 5: 0.3 mm
distance between support member 1 and tip of lip 4: 0 to 3.5 mm
<Magnet Portion>
overall width: 150 mm permanent magnet: neodymium alloy magnet magnetic force of 4,000 gauss being generated near lip 4
yoke 12: S10C (high-permeability material)
size of magnetic gap 15: 1 mm
height position of magnetic gap 15 with respect to slit 5: 0 mm
distance between support member 1 and tip of yoke 12: 0.5 mm <Coating Material>
type: for forming magnetic film of VHS video tape
coating thickness: 2 to 3 μm (dried)

<Support Member>
width: 127 mm
thickness: 14.5 μm
material: polyethylene terephthalate
tension in coating: 3 kgf in overall width of support member
traveling speed: 400 to 1,000 m/min.

The traveling speed of the support member 1 was changed within the range of 400 to 1,000 m/min., the distance between the support member 1 and the tip of the lip 4 was adjusted so that preferable coating could be performed under the condition.

When coating was performed as described above, even if the traveling speed of the support member 1 increased up to 1,000 m/min., the coating could be performed without any problem. When the coating apparatus described in the first embodiment was used as in this example, the lip 4 was not in contact with the support member 1, the surface of the support member 1 could be prevented from being damaged or shaved, and it was difficult to form scratches on the formed coating film caused by dust, a foreign material, shavings of the support member 1, or the like.

In comparison with the above coating film, a magnetic coating material was coated under the same conditions as described above except that the magnet portion 3 was not arranged. In this case, the magnetic coating material was adhered to the support member 1 in a blind-like form, and a preferable coating film could not be formed.

By using a magnetic coating material (using iron-based magnetic powder) for forming the magnetic layer of an audio tape was used in place of the magnetic coating material coated in this example, coating was performed under the same conditions as those in this example. In this case, as in this example, even if the traveling speed of the support member 1 increased to 1,000 m/min, coating could be performed without any problem.

Even if the thickness of the support member 1 was changed within the range of 12 to 14.5 μm, even if the thickness of dried magnetic coating film was changed within the range of 2 to 4 μm, even if both the lips 7 and 8 defining the slit 5 at the tip of the die 2 are composed of a non-magnetic material, or the gap of the slit 5 was changed into 0.26 μm, as in this example, preferable coating could be performed until the traveling speed of the support member 1 became a high speed such as 1,000 m/min.

Therefore, the following could be understood. That is, when a magnetic coating material was coated by using the coating apparatus in which the magnet portion 3 having the magnetic gap 15 was arranged so that the lip 4 and the magnet portion 3 interposed the support member 1, a preferable coating film which was free from overflow or scratches could be formed at a high speed.

Example 2

In this case, the width of the support member 1, the coating width of the magnetic coating material, the type of the magnetic coating material, and the like which were different from those in Example 1 were used, and the magnetic coating material was coated.

More specifically, by using the coating apparatus shown in FIGS. 1 and 2, the magnetic coating material was coated on the traveling support member 1 under the following conditions.

Settings in the Coating Apparatus

<Die>
overall width: 700 mm
coating width: 600 mm
gap of slit 5: 0.26 mm

<Magnet Portion>
the same arrangement as that in Example 1

<Coating Material>
type: for forming magnetic layer of 8-mm video tape (by using metal magnetic powder)
coating thickness: 1.5 to 2 μm (dried)

<Support Member>
width: 620 mm
thickness: 8 to 12 μm
material: polyethylene terephthalate When the traveling speed of the support member 1 was adjusted so that preferable coating could be performed under the above conditions, coating could be performed at 350 m/min. without any problem.

Therefore, the following could be understood. That is, even if the coating width of the magnetic coating material, the type of the magnetic coating materials, and the like were changed, a preferable coating film having a very small thickness could be formed at a high speed.

Example 3

In this case, the width of the support member 1, the coating width of the magnetic coating material, the type of the magnetic coating material, and the like were different from those in Example 1, and the magnetic coating material was coated.

More specifically, by using the coating apparatus shown in FIGS. 1 and 2, the magnetic coating material was coated on the traveling support member 1 under the following conditions.

Settings in the Coating Apparatus

<Die>
overall width: 1,320 mm
coating width: 1,220 mm
lip 4: refractory metal (non-magnetic material) gap of slit 5: 0.26 mm <Magnet Portion>
the same arrangement as that in Example 1

<Coating Material>
type: for forming magnetic layer of VHS video tape
coating thickness: 2 to 2.7 μm (dried)

<Support Member>
width: 1,240 mm
thickness: 12 to 14.5 μm
material: polyethylene terephthalate When the traveling speed of the support member 1 was adjusted so that preferable coating could be performed under the above conditions, coating could be performed at 600 m/min. without any problem.

Therefore, the following could be understood. That is, even if the coating width of the magnetic coating material, the type of the magnetic coating materials, and the like were changed, a preferable coating film could be formed at a high speed.

Example 4

In this case, the traveling direction of the support member 1 with respect to the arrangement position of the die 2 and the magnet portion 3 was changed, and the magnetic coating material was coated.

More specifically, by using the coating apparatus shown in FIGS. 1 and 2, the magnetic coating material was coated on the traveling support member 1 under the following conditions.

Settings in the Coating Apparatus

<Die>
the same arrangement as that in Example 1 except that both lips 7 and 8 consist of non-magnetic material <Magnet Portion>
the same arrangement as that in Example 1

<Coating Material>
the same type as that in Example 1
coating thickness: 2 μm (dried)

<Support Member>
the same width, thickness, and material as those in Example 1
traveling direction: ±30°, when a line on which slit central surface and major surface of support member cross each other is set to be center, and when angle at which slit central surface of major surface of support member are perpendicular to each other is set to be 0°
traveling speed: 250 to 800 m/min.

Note that the traveling direction of the support member 1 was changed within the range of ±30°, and the traveling speed of the support member 1 was changed within the above range under the above conditions.

Results obtained by performing coating under the above settings are shown in Table 1. In Table 1, ○ indicates a case wherein preferable coating could be performed; and x indicates a case wherein the support member 1 was in contact with either of both the lips 7 and 8 or either of both the yokes 13 and 14 of the magnet portion 3.

of 800 m/min. However, the following is a problem on only designing. That is, when the traveling direction of the support member 1 is set to be ±20° or more, the support member 1 is in contact with either the die 2 or the magnet portion 3.

Therefore, the following was understood. That is, even if the traveling direction of the support member 1 with respect to the die 2 and the magnet portion 3 were changed, a preferable coating film could be formed at a high speed.

Example 5

In this case, the traveling direction of the support member 1 and the arrangement directions of the die 2 and the magnet portion 3 were changed, and the magnetic coating material was coated. More specifically, the coating apparatus shown in FIGS. 1 and 2 was arranged so that the slit central surface of the die 2 was tilted at 45° with reference to the horizontal plane as shown in FIG. 3, and the coating material was coated on the traveling support member 1 under the following conditions.

Settings in the Coating Apparatus

<Die>
overall width: 1,320 mm
coating width: 1,220 mm
lip 4: refractory metal (non-magnetic material)
gap of slit 5: 0.26 mm <Magnet Portion>
the same arrangement as that in Example 1

<Coating Material>
type: for forming magnetic layer of audio tape
coating thickness: 4 to 6 μm (dried)

<Support Member>
width: 1,240 mm
thickness: 8 to 12 μm
material: polyethylene terephthalate When the traveling speed of the support member 1 was adjusted so that preferable coating could be performed under the above conditions, coating could be performed at 600 m/min. without any problem.

Therefore, the following could be understood. That is, even if the traveling direction of the support member 1 and the arrangement directions of the die 2 and the magnet portion 3 were tilted at 45°, a preferable coating film could be formed at a high speed.

TABLE 1

| Traveling Speed | Traveling Direction of Support Member with respect to Die | | | | | | | | | | | | |
|---|---|---|---|---|---|---|---|---|---|---|---|---|---|
| (m/min.) | −30 | −25 | −20 | −15 | −10 | −5 | 0 | +5 | +10 | +15 | +20 | +25 | +30 |
| 250 | x | x | x | ○ | ○ | ○ | ○ | ○ | ○ | ○ | x | x | x |
| 500 | x | x | x | ○ | ○ | ○ | ○ | ○ | ○ | ○ | x | x | x |
| 600 | x | x | x | ○ | ○ | ○ | ○ | ○ | ○ | ○ | x | x | x |
| 700 | x | x | x | ○ | ○ | ○ | ○ | ○ | ○ | ○ | x | x | x |
| 800 | x | x | x | ○ | ○ | ○ | ○ | ○ | ○ | ○ | x | x | x |

According to Table 1, the following was understood. That is, the traveling direction of the support member 1 with respect to the die 2 and the magnet portion 3 was set to be ±20° or more, the support member 1 was in contact with either of the die 2 and the magnet portion 3; and when the traveling direction of the support member 1 was set to be ±15°, coating could be preferably performed at a maximum

Example 6

In this case, the traveling direction of the support member 1 and the arrangement directions of the die 2 and the magnet portion 3 were changed, and the magnetic coating material was coated.

More specifically, as in Example 6, the coating apparatus shown in FIGS. 1 and 2 was arranged so that the slit central surface of the die 2 was tilted at 45° with reference to the horizontal plane as shown in FIG. 3, and the coating material was coated on the traveling support member 1 under the following conditions.

Settings in the Coating Apparatus
<Die>
  overall width: 1,320 mm
  coating width: 1,220 mm
  lip 4: refractory metal (non-magnetic material)
  gap of slit 5: 0.26 mm
<Magnet Portion>
  the same arrangement as that in Example 1
<Coating Material>
  type: for forming magnetic layer of 8-mm video tape
  coating thickness: 2 μm (dried)
<Support Member>
  width: 1,240 mm
  thickness: 8 to 12 μm
  material: polyethylene terephthalate When the traveling speed of the support member 1 was adjusted so that preferable coating could be performed under the above conditions, coating could be performed at 350 m/min. without any problem.

Therefore, the following could be understood. That is, even if the traveling direction of the support member 1 and the arrangement directions of the die 2 and the magnet portion 3 were tilted, and the type of the magnetic coating material was changed, a preferable coating film could be formed at a high speed.

Example 7

In this case, the traveling direction of the support member 1 and the arrangement directions of the die 2 and the magnet portion 3 were further changed, and the magnetic coating material was coated.

More specifically, the coating apparatus shown in FIGS. 1 and 2 was arranged so that the slit central surface of the die 2 was tilted at 90° with reference to the horizontal plane as shown in FIG. 4, and the coating material was coated on the traveling support member 1 under the following conditions.

Settings in the Coating Apparatus
<Die>
  overall width: 700 mm
  coating width: 600 mm
  lip 4: refractory metal (non-magnetic material)
  gap of slit 5: 0.26 mm
<Magnet Portion>
  the same arrangement as that in Example 1
<Coating Material>
  type: for forming magnetic layer of VHS video tape
  coating thickness: 2 μm (dried)
<Support Member>
  width: 620 mm
  thickness: 12 to 14.5 μm
  material: polyethylene terephthalate When the traveling speed of the support member 1 was adjusted so that preferable coating could be performed under the above conditions, coating could be performed at 600 m/min. without any problem.

Therefore, the following could be understood. That is, even if the traveling direction of the support member 1 and the arrangement directions of the die 2 and the magnet portion 3 were tilted at 90°, a preferable coating film could be formed at a high speed.

Example 8

In this example, to examine the coating performance of the coating apparatus described in the second embodiment, various settings in the coating apparatus were performed to coat a magnetic coating material.

More specifically, by using the coating apparatus shown in FIGS. 5 and 6, a magnetic coating material was coated on the traveling support member 1 under the following conditions.

Settings in the Coating Apparatus
<Die>
  overall width: 160 mm
  coating width: 110 mm
  lip 24: refractory metal (magnetic material)
  upper lip 27 thickness: 5 mm
  lower lip 28 thickness: 3 mm
  gap of slit 5: 0.3 mm
<Magnet Portion>
  overall width: 150 mm
  permanent magnet 11: neodymium alloy magnet magnetic force of 500 to 4,000 gauss being generated near lip 24
  yoke 12: S10C (high-permeability material)
  size of magnetic gap 15: 1 mm
  interval d between tip of yoke 12 and tip of lip 24: 0.2 to 3 mm
  height position h of magnetic gap 15 with respect to slit 5: ±1.0 mm
<Coating Material>
  type: for forming magnetic film of VHS video tape
  coating thickness: 2 to 3 μm (dried)
<Support Member>
  width: 125 mm
  thickness: 14 μm
  material: polyethylene terephthalate
  tension: 3 to 4 kgf in overall width of support member
  traveling speed: 400 to 600 m/min.

The magnetic force generated near the lip 24 was changed within the range of 500 to 4,000 gauss. A holding amount of the support member 1, the interval d between the yoke 12 and the lip 24, the height position h of the magnetic gap 15 with respect to the slit 5, and the traveling speed of the support member 1 were adjusted such that preferable coating (free from overflow or scratches) could be performed at the magnetic force.

When the magnetic coating material was coated with the magnetic force changed, a maximum coating speed at which preferable coating could be performed was examined. The results shown in Table 2 were obtained. Table 2 also shows the range of the interval d between the tip of the yoke 12 and the tip of the lip 24 and the range of the height position h of the magnetic gap 15 under which the maximum coating speed can be achieved. In comparison with the maximum coating speed, Table 2 also shows a maximum coating speed obtained when a coating apparatus having the same setting as described above except the magnet portion 3 was not arranged is used.

| Magnetic Force (gauss) | Maximum Coating Speed (m/min.) | Interval d between Yoke and Lip (mm) | Height Position h of Magnetic Gap (mm) |
| --- | --- | --- | --- |
| 0 | 450 | — | — |
| 500 | 500 | 0.2–0.5 | 0 |
| 1500 | 550 | 0.2–0.5 | 0 |
| 3000 | 600 | 0.2–3.0 | −1.0–+1.0 |
| 4000 | 600 | 0.2–3.0 | −1.0–+1.0 |

According to Table 2, the following can be understood. That is, the maximum coating speed can be increased so that the magnet portion 3 is arranged to face the die 22. In addition, as the magnetic force generated near the lip 24 is increased, even if the interval d between the tip of the yoke 12 and the tip of the lip 24 and the height position h of the magnetic gap 15 with respect to the slit 5 are roughly set, the maximum coating speed can be increased. However, it is also understood that, even if the magnetic force is set to be 3,000 gauss or more, the maximum coating speed cannot be increased.

Therefore, the following can be understood. That is, when a magnetic force of 3,000 gauss or more is generated, the interval d between the tip of the yoke 12 and the tip of the lip 24 is set to be 0.2 to 3.0 mm, and the height position h of the magnetic gap 15 with respect to the slit 5 is set to be ±1.0 mm, the magnetic coating material can be coated at a high coating speed.

In this case, the lip 24 was composed of the magnetic material. In comparison with the above lip 24 composed of the magnetic material, the lip 24 was composed of a non-magnetic material, and the magnetic coating material was coated in the same manner as described above. More specifically, a magnetic force of 3,000 gauss was generated near the lip 24 to coat the magnetic coating material. A maximum coating speed at this time was examined.

As a result, when the lip 24 was composed of the magnetic material, as shown in Table 2, the maximum coating speed was 600 m/min. On the other hand, when the lip 24 was composed of the non-magnetic material, the maximum coating speed was 500 m/min.

Accordingly, the following can be understood. That is, in the coating apparatus in which the lip 24 defining the slit 5 at the tip of the die 2 is arranged in contact with the support member 1, the lip 24 is preferably composed of the magnetic material. Therefore, a magnetic flux from the magnet portion 3 can be concentrated, and the movement of the magnetic coating material can be preferably assured.

The coating apparatus according to the present invention has been described above. The coating apparatus of the present invention is not limited to the arrangements described in the above embodiments, and is not limited to the conditions described in the above examples, and various changes and modifications can be effected.

In the above embodiment, although a neodymium alloy magnet is used as the permanent magnet 11 in the magnet portion 3, a magnet having a desired magnetic force and composed of another material may be used, and an electromagnet may be used in place of the permanent magnet 11. In the shape of the yoke 12 in the magnet portion 3, when the tips of the magnet portion 3 are adjacent to each other, and the magnetic gap 15 having a desired size is formed between both the tips, the lower yoke 14 need not be bent.

In the die 2, the lip 4 is composed of a magnetic material such as S10C. But the lip 4 may be composed of another material. In addition, not only the lip 4 but also the overall die 2 may be composed of a magnetic material.

In the coating apparatus in which the lip 24 is arranged out of contact with the support member 1 as described in the first embodiment, a case wherein the arrangement directions of the die 2 and the magnet portion 3 are tilted at 45° or 90° is described in Examples 5, 6, and 7. The arrangement directions may be tilted at an arbitrary angle. In addition, in the coating apparatus in which the lip 24 is in contact with the support member 1 as described in the second embodiment, the arrangement directions of the die 2 and the magnet portion 3 can be arbitrarily changed.

The types of the coating material 6 coated on the support member 1, fields to which the present invention is applied, and the like are not limited.

As is apparent from the above description, in a coating apparatus according to the present invention, the movement of the coating material supplied onto the support member can be assured by a magnetic flux concentrated by the magnetic gap of the magnetic portion. For this reason, when the coating apparatus according to the present invention, and when high-speed coating and thin-film coating are to be performed, abnormal behavior of the coating material can be prevented, and stable coating can be performed.

Therefore, when the present invention is applied, a preferable coating film can be formed at high productivity.

What is claimed is:

1. An extrusion coating apparatus comprising:
    a die including a coating material reservoir therein, a tip portion, and a slit extending from the coating material reservoir to the tip portion and dividing the tip portion into a first lip and a second lip, said slit being bounded by a first surface on the first lip and a second surface on the second lip; and
    a magnet portion including a front end with a first arm and a second arm defining a magnetic gap therebetween, the front end of the magnetic portion being disposed in spaced and opposing relation to the tip portion of the die, whereby coating material may be supplied to the coating material reservoir, extruded from the slit and coated on a continuously traveling support member interposed between the front end of the magnet portion and the tip portion of the die and out of contact with the front end of the magnetic portion and the tip portion of the die.

2. A coating apparatus according to claim 1, wherein said first and second lips are composed of a magnetic material.

3. A coating apparatus according to claim 1, wherein an interval between the front end of said magnet portion and the tip of said die is set to be 0.2 to 3 mm.

4. A coating apparatus according to claim 1, wherein the magnetic gap in the front end of the magnet portion is defined by a first surface on the first arm and a second surface on the second arm and the magnetic portion is positioned with respect to the tip portion so that the first surface of the first arm is aligned with reference to height of the first surface of the first lip ± about 1 mm.

5. A coating apparatus according to claim 1, wherein said magnet portion has a magnetic force of 500 to 6,000 gauss near the first and second lips.

6. A coating apparatus according to claim 1, wherein the first and second lips of the tip portion include a pair of angled surfaces extending away from the slit disposed at an angular orientation with respect to each other of from about 30° to about 110°.

7. A coating apparatus according to claim 1, wherein the first lip and the second lip terminate in a free end adjacent an opening of the slit and wherein the free end of the second lip is offset from the free end of the first slit by from about +1.0 mm to about −1.5 mm.

8. A coating apparatus according to claim 7, wherein wherein the first and second lips of the tip portion include a pair of angled surfaces extending away from the slit disposed at an angular orientation with respect to each other of from about 30° to about 110°.

9. An extrusion coating apparatus comprising:

a die having a coating material reservoir to which a coating material is supplied, the coating material being coated on a continuously traveling support member while the coating material is extruded from a slit formed between a first lip and a second lip in a tip portion of said die; and a magnet portion including a front end with a first arm and a second arm defining a magnetic gap therebetween and arranged so that the front end of said magnetic portion and the tip portion of said die are spaced and opposed from each other to interpose the support member therebetween; wherein said upper and lower lips defining the slit at the tip of said die comprising a magnetic material and being arranged so that said lower lip is in contact with the support member.

10. A coating apparatus according to claim 9, wherein an interval between the front end of said magnet portion and the tip of said die is from about 0.2 to about 3 mm.

11. A coating apparatus according to claim 9, wherein the slit in the tip portion is bounded by a first surface on the first lip and a second surface on the second lip, and wherein the magnetic gap in the front end of the magnet portion is defined by a first surface on the first arm and a second surface of the second arm and the magnetic portion is positioned with respect to the tip portion so that the first surface of the first arm is aligned with reference to height of the first surface of the first lip ± about 1 mm.

12. A coating apparatus according to claim 9, wherein said magnet portion has a magnetic force of 500 to 6,000 gauss near the first and second lips.

13. An extrusion coating apparatus comprising:

a die having a coating material reservoir to which a coating material is supplied, the coating material being coated on a continuously traveling support member while the coating material is extruded from a slit formed between a first lip and a second lip in a tip portion of said die, the first lip and the second lip each comprising a magnetic material; and a magnet portion having adjacent tip portions to form a magnetic gap arranged such that said magnetic portion and the tip portion of said die are disposed in spaced and opposing relation to each other to interpose the support member therebetween; wherein the first and second lips and the tip portions of the magnet portion being arranged out of contact with the support member.

* * * * *